US008867913B2

(12) United States Patent
Gareau et al.

(10) Patent No.: US 8,867,913 B2
(45) Date of Patent: Oct. 21, 2014

(54) OPTICAL TRANSPORT NETWORK HIGH ORDER MAPPING SYSTEMS AND METHODS

(71) Applicant: Ciena Corporation, Hanover, MD (US)

(72) Inventors: Sebastien Gareau, Ottawa (CA); Tim Norman, Ottawa (CA); Richard Wyatt, Ottawa (CA); Michael Hubbard, Ottawa (CA)

(73) Assignee: Ciena Corporation, Hanover, MD (US)

( * ) Notice: Subject to any disclaimer, the term of this patent is extended or adjusted under 35 U.S.C. 154(b) by 136 days.

(21) Appl. No.: 13/633,173

(22) Filed: Oct. 2, 2012

(65) Prior Publication Data

US 2014/0093235 A1 Apr. 3, 2014

(51) Int. Cl.
*H04J 3/16* (2006.01)

(52) U.S. Cl.
CPC ............ *H04J 3/1652* (2013.01); *H04J 3/1664* (2013.01)
USPC .................. 398/33; 398/47; 398/51; 398/58; 398/154; 398/50

(58) Field of Classification Search
CPC ..... H04J 3/1652; H04J 3/07; H04J 2203/006; H04J 2203/0085; H04J 3/12; H04J 3/14; H04J 14/02; H04J 14/0227; H04J 2203/0046; H04J 2203/0058; H04J 2203/0069; H04J 2203/0073; H04J 2203/0082
USPC ............. 370/254–350; 709/201–213; 398/33, 398/47, 51, 58, 154, 50
See application file for complete search history.

(56) References Cited

U.S. PATENT DOCUMENTS

| 7,602,814 B2 | 10/2009 | Meagher et al. |
| 7,873,073 B2 | 1/2011 | Frlan et al. |
| 7,876,760 B2 | 1/2011 | Carson |
| 8,644,340 B2 * | 2/2014 | Loprieno et al. ............. 370/473 |
| 8,693,480 B2 * | 4/2014 | Dong et al. ............. 370/395.51 |
| 2006/0140225 A1 | 6/2006 | Christensen et al. |
| 2008/0075113 A1 | 3/2008 | Harley et al. |
| 2008/0219669 A1 * | 9/2008 | Fourcand ..................... 398/98 |
| 2009/0022497 A1 | 1/2009 | Mateosky et al. |
| 2010/0080245 A1 | 4/2010 | Kisaka et al. |
| 2010/0226652 A1 | 9/2010 | Vissers et al. |
| 2010/0272438 A1 | 10/2010 | Conklin et al. |
| 2011/0032950 A1 | 2/2011 | Harley et al. |
| 2012/0155874 A1 | 6/2012 | Lin et al. |
| 2012/0201535 A1 | 8/2012 | Loprieno et al. |

* cited by examiner

*Primary Examiner* — Ayaz Sheikh
*Assistant Examiner* — Debebe Asefa
(74) *Attorney, Agent, or Firm* — Clements Bernard PLLC; Christopher L. Bernard; Lawrence A. Baratta, Jr.

(57) ABSTRACT

Optical Transport Network (OTN) High Order (HO) mapping systems and methods utilize pointer processing to map one HO signal into another similarly sized HO signal. An OTN HO mapping method and circuit include receiving a first HO signal at a first rate, asynchronously mapping the first HO signal into a second HO signal at a second rate, wherein the first rate and the second rate are substantially similar, translating a portion of overhead from the first HO signal to overhead of the second HO signal, utilizing pointers in the overhead of the second HO signal for frame alignment of the first HO signal, and transmitting the second HO signal containing the first HO signal.

20 Claims, 5 Drawing Sheets

OPTICAL TRANSPORT NETWORK HIGH ORDER MAPPING SYSTEMS AND METHODS

FIELD OF THE INVENTION

Generally, the field of art of the present disclosure pertains to optical networking systems and methods, and more particularly, to Optical Transport Network (OTN) High Order (HO) mapping systems and methods utilizing pointer processing to map one HO signal into another similarly sized HO signal.

BACKGROUND OF THE INVENTION

Optical Transport Network (OTN) is defined inter alia in ITU-T G.709/Y.1331 (02/12) "Interfaces for the optical transport network," the contents of which are incorporated by reference herein. As bandwidth rates have increased, e.g. 10 Gb/s to 40 Gb/s to 100 Gb/s and beyond, OTN related standards and addendums have been introduced to address these increased signal rates. For example, at the early onset of 40 Gb/s, the OTN standards and addendums at the time only specified an Optical channel Transport Unit level 3 (OTU3) signal without guidance on how to map/multiplex 4x independent G.Sup43 OTU2e/1e 10 Gb/s (i.e., 10 Gigabit Ethernet LAN PHY signals) into the 40 Gb/s OTU3 container. As expected, standards have some lag with vendor implementation, and vendors move forward with proprietary schemes to address higher rate signals before standardization is finalized. Once new, higher rate signals are standardized, there can be differences and rate variances with various vendors' proprietary schemes. Also, it is often important to keep rates consistent with various vendors' proprietary schemes to accommodate current optics and modems in optical systems.

For example, related to 40 Gb/s OTN, Ciena Corporation and Nortel MEN developed a proprietary OTU3+ scheme to overclock a 40 Gb/s OTN signal in order to fit Low Order (LO) Optical channel Data Unit level 2e (ODU2e) 10 Gb/s signals. The OTU3+ has a bit rate of approximately 43 Gb/s. Current standards define an OTU3e2 which has a bit rate slightly faster than the OTU3+. Thus, mapping an OTU3e2 onto optical equipment designed to support an OTU3+ involves mapping a slightly larger signal into a slightly smaller signal in OTN. Similarly, it is expected these same issues will arise when moving to 100 Gb/s, 1 Tb/s, etc. rate signals in OTN. Disadvantageously, there is no current mechanism within OTN to support mapping signals in such a fashion.

Specifically, the Asynchronous Mapping Procedure (AMP) and the Generic Mapping Procedure (GMP) schemes defined in G.709 do allow for mapping of slightly different rates, but these rates are generally within +/−100 parts per million (ppm). The aforementioned signals, while substantially similar in rate, have a difference in rate too great to use these schemes. Further, AMP and GMP do not work because these schemes only support mapping an Optical channel Data Unit level j (ODUj) into an Optical channel Payload Unit level k (OPUk) where the OPUk rate is greater than the ODUj rate. Again, the aforementioned signals have ODUk greater than the OPUk.

BRIEF SUMMARY OF THE INVENTION

In an exemplary embodiment, an Optical Transport Network (OTN) High Order (HO) mapping method includes receiving a first HO signal at a first rate; asynchronously mapping the first HO signal into a second HO signal at a second rate, wherein the first rate and the second rate are substantially similar; translating a portion of overhead from the first HO signal to overhead of the second HO signal; utilizing pointers in the overhead of the second HO signal for frame alignment of the first HO signal; and transmitting the second HO signal containing the first HO signal. The OTN HO mapping method can further include stripping a portion of the overhead from the first HO signal. The OTN HO mapping method can further include translating the portion of overhead including Path Monitoring bytes and Tandem Connection Monitoring bytes from the first HO signal to the overhead of the second HO signal. The OTN HO mapping method can further include stripping the portion of the overhead from the first HO signal including a remainder of the overhead besides the Path Monitoring bytes, Tandem Connection Monitoring bytes, and Optical channel Path Unit level k overhead.

The OTN HO mapping method can further include stripping a Frame Alignment Signal byte from the overhead from the first HO signal and utilizing the pointers to preserve frame alignment. The OTN HO mapping method can further include moving a Multi Frame Alignment Signal byte from the overhead of the first HO signal to another unused location of the overhead of the first HO signal or into the second HO signal. The first HO signal and the second HO signal can be asynchronous to one another. The first rate can be slightly larger than the second rate, and the OTN HO mapping method can further include utilizing a portion of the overhead of the second HO signal for a portion of payload of the first HO signal and some of the overhead of the first HO signal. The pointers can be located in mapping specific overhead bytes in Optical channel Path Unit level k (OPUk) overhead. The OTN HO mapping method can further include communicating phase and frequency information of the first HO signal via justification events in justification control bytes in the overhead of the second HO signal. The justification control bytes can be located in mapping specific overhead bytes in Optical channel Path Unit level k (OPUk) overhead.

In another exemplary embodiment, an Optical Transport Network (OTN) High Order (HO) mapping circuit includes circuitry configured to receive a first HO signal at a first rate; asynchronously map the first HO signal into a second HO signal at a second rate, wherein the first rate and the second rate are substantially similar; translate a portion of overhead from the first HO signal to overhead of the second HO signal; utilize pointers in the overhead of the second HO signal for frame alignment of the first HO signal; and transmit the second HO signal containing the first HO signal; wherein the first HO signal and the second HO signal are asynchronous to one another. The circuitry can be further configured to strip a portion of the overhead from the first HO signal. The circuitry can be further configured to translate the portion of overhead including Path Monitoring bytes and Tandem Connection Monitoring bytes from the first HO signal to the overhead of the second HO signal; and strip the portion of the overhead from the first HO signal including a remainder of the overhead besides the Path Monitoring bytes, Tandem Connection Monitoring bytes, and Optical channel Path Unit level k overhead.

The circuitry can be further configured to strip a Frame Alignment Signal byte from the overhead from the first HO signal and utilize the pointers to preserve frame alignment. The circuitry can be further configured to move a Multi Frame Alignment Signal byte from the overhead of the first HO signal to another unused location of the overhead of the first HO signal or into the second HO signal. The first rate can be slightly larger than the second rate, and the circuitry can be further configured to utilize a portion of the overhead of the second HO signal for a portion of payload of the first HO signal. The pointers can be located in mapping specific overhead bytes in Optical channel Path Unit level k (OPUk) overhead. The circuitry can be further configured to communicate phase and frequency information of the first HO signal via justification events in justification control bytes in the overhead of the second HO signal; wherein the justification control bytes are located in mapping specific overhead bytes in Optical channel Path Unit level k (OPUk) overhead.

In yet another exemplary embodiment, an optical system includes circuitry configured to receive a first HO signal at a first rate; asynchronously map the first HO signal into a second HO signal at a second rate, wherein the first rate and the second rate are substantially similar; translate a portion of overhead from the first HO signal to overhead of the second HO signal; utilize pointers in the overhead of the second HO signal for frame alignment of the first HO signal; and transmit the second HO signal containing the first HO signal; wherein the first HO signal and the second HO signal are asynchronous to one another; and optical components configured to operate at the second rate and interface the first HO signal within the second HO signal.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, OTN HO mapping systems and methods are described which include a mapping scheme to map/multiplex and demap/demultiplex substantially similar rate signals. The substantially similar rate signals are each HO signals that have similar rates. Normal mapping in OTN generally involves a Low Order (LO) ODU to a HO ODU, i.e. placing an entire LO ODU into the payload area of the HO ODU. In the OTN HO mapping systems and methods described herein, HO to HO mapping is presented where the first HO ODU needs to be preserved, minus whatever can be stripped out of overhead that is either unused or recoverable by other means. For example, the OTN HO mapping systems and methods propose utilizing pointers instead of Multi Frame Alignment Signals (MFAS).

The OTN HO mapping systems and methods utilize a pointer interpretation method to map similarly sized Optical channel Data Unit level k (ODUk) signal transparently preserving rates and payload. In an exemplary embodiment, the OTN HO mapping systems and methods can be used to map an ODU3e2 into an ODU3+ and the like. Advantageously, the OTN HO mapping systems and methods provide a mechanism to map new recommended G.Sup43 OTN signals into legacy proprietary schemes. This can add a layer of abstraction and can simplify interoperability with existing equipment, networks, and technologies while supporting new standards. Also, the OTN HO mapping systems and methods enable keeping current optical transport technology and modems unchanged enabling interoperability with legacy transport equipment in the field while also providing new mapping features provided by the G.Sup43 recommendation or other standards.

Figure 1:
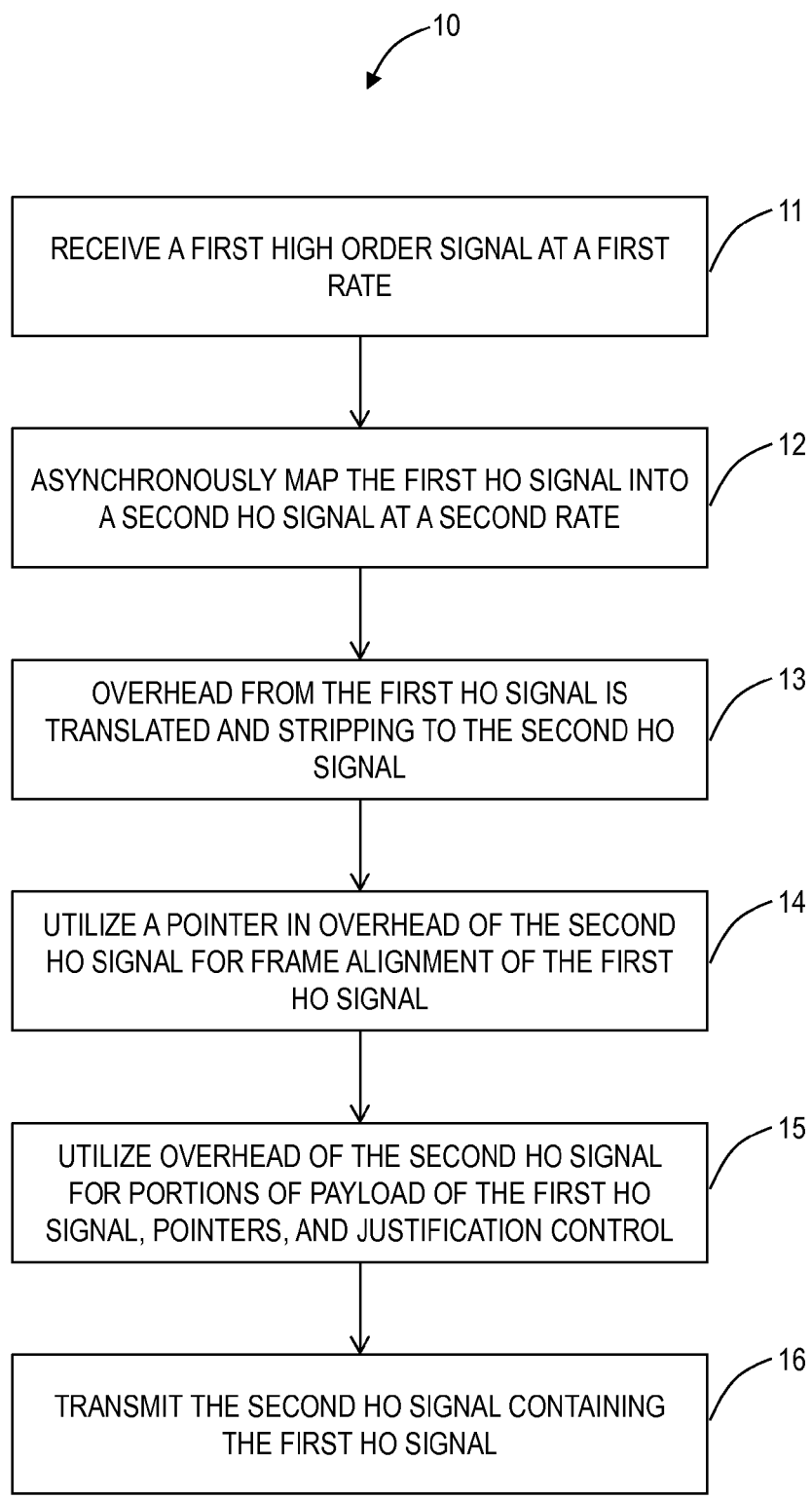
FIG. 1 is a flowchart of an Optical Transport Network (OTN) High Order (HO) mapping method.

Referring to FIG. 1, in an exemplary embodiment, a flowchart illustrates an OTN HO mapping method 10. The mapping method 10 is configured to map a second signal into a first signal with the first signal having a slightly different (e.g., higher) rate than the second signal. In an exemplary embodiment, the first signal can be an ODU3e2 and the second signal can be an ODU3+. Other variants of ODUk signals are also contemplated for mapping therebetween. Of note, the first and second signals are both HO OTN signals and the rates are substantially similar but slightly different. The mapping method 10 includes receiving the first HO signal at a first rate (step 11). That is, the mapping method 10 receives the fully formed first HO signal. For example, the ODU3e2 can be the first HO signal and can include LO signals such as up to 32 ODU0s, up to 16 ODU1s, up to 4 ODU2/1e/2e, up to 1 ODU3, and/or up to 32 time slots of ODUflex. The first HO signal is operating at a first rate which is slightly larger than a second rate of the second HO signal preventing a direct mapping of the first HO signal into the second HO signal.

The mapping method 10 asynchronously maps the first HO signal into the second HO signal at the second rate (step 12). Due to the rate differences between the first HO signal and the second HO signal, the frames from the first HO signal will not be synchronized in the second HO signal. The mapping method 10 includes translating and stripping overhead from the first HO signal to the second HO signal (step 13). For example, Path Monitoring (PM) and Tandem Connection Monitoring (TCM) overhead from the first HO signal is used and translated to the second HO signal. Also, some of the overhead in the second HO signal is used to increase payload area as described herein. The rest of the overhead in the first HO signal can be stripped off except for OPUk overhead which is mapped to the second HO signal. The OPUk overhead must be maintained in cases where the first HO signal contains a multiplexed structure and LO ODUj are mapped into it via a GMP scheme.

The mapping method 10 utilizes a pointer in overhead of the second HO signal for frame alignment of the first HO signal (step 14). For example, this may replace the Frame Alignment Signal (FAS) in the OTN overhead. That is, the frame alignment of the first HO signal is preserved using pointers contained in the second OH signal overhead. Note, the first HO signal and the second HO signal are asynchronous to one another. The mapping method 10 utilizes overhead of the second HO signal for portions of the payload of the first HO signal, pointers, and justification control (step 15). Since the first rate is slightly larger than the second rate, the overhead of the second HO signal needs to be used for various purposes to maintain rate compatibility. Variously, bytes used in the second HO signal OTUk overhead include, for example, reserved bytes (RES), experimental bytes (EXP), Tandem Connection Monitoring Activation/Deactivation coordination protocol bytes (TCM ACT), fault type and fault location reporting communication channel bytes (FTFL), and the like. Bytes used in the second HO signal Optical channel Path Unit level k (OPUk) overhead can include mapping specific overhead bytes. Generally, the portion of the second HO signal overhead used can include any of the ODUk or OPUk fields, with the aforementioned specific bytes given as examples. Of course, the more second HO signal overhead used, the fewer OTN features can be support on this second HO signal link (e.g., TCM, Delay measurement, General Communications Channel (GCC), Automatic Protection Switching (APS), etc.).

Phase/frequency information of the first HO signal is communicated via justification events in the second HO signal's justification control, but the granularity optionally can be coarse (to simplify implementation) so a remainder is also used to help with jitter/wander mitigation. Parity and voting can optionally protect the integrity of the pointer, remainder and justification control words. The Multi-Frame Alignment Signal (MFAS) of the first OH signal can be relocated to an unused byte inside the OPUk overhead of the second OH signal, such as a Negative Justification Opportunity (NJO). As described above, the FAS is removed from the first OH signal, but reconstructed using a pointer interpretation method. Finally, the second HO signal is transmitted containing the first HO signal (step 16). Note, the mapping method 10 has been described herein with respect to mapping the first HO signal into the second HO signal. Those of ordinary skill in the art will recognize the reverse process is also contemplated for obtaining the first HO signal from the second HO signal, i.e. a demapping method.

Figure 2:
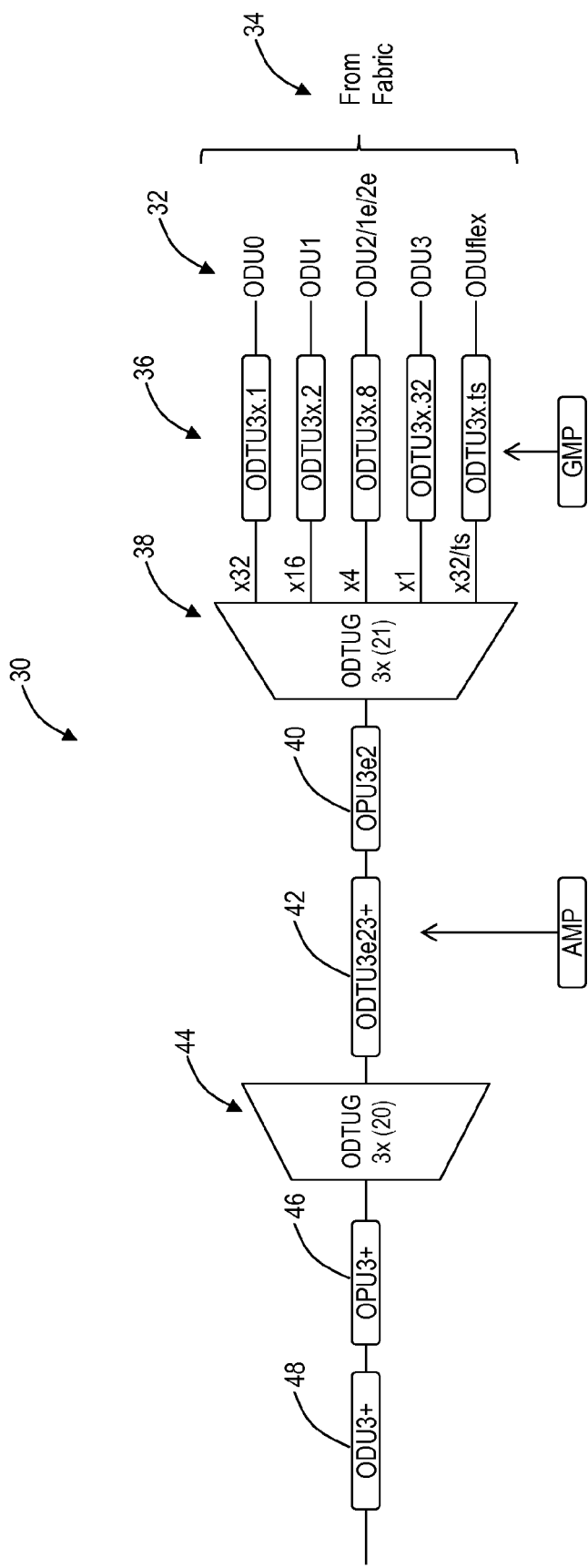
FIG. 2 is a block diagram of an OTN HO mapping circuit configured to map an ODU3e2 into an ODU3+.

Referring to FIG. 2, in an exemplary embodiment, a block diagram illustrates an OTN HO mapping circuit 30 configured to map an ODU3e2 into an ODU3+. The mapping circuit 30 utilizes the mapping method 10, and is a specific exemplary embodiment using the ODU3e2 as the first signal and the ODU3+ as the second signal. The ODU3+ is slightly slower than the ODU3e2. The mapping circuit 30 receives various Low Order (LO) signals 32 from a fabric 34. Note, while described herein directionally from the fabric 34 to the mapping circuit 30 for illustration purposes, the mapping circuit 30 is bi-directional. The various LO signals 32 are mapped via a GMP though an Optical Channel Data Tributary Unit Group 3x (ODTUG 3x) 38 with Payload Type (PT)=21. The ODTUG 3x 38 provides an Optical channel Payload Unit layer 3e2 (OPU3e2). However, as described herein, the OPU3e2 cannot be mapped directly into an OPU3+ payload envelope due to rate differences.

The mapping method 10 is implemented in an ODTU3e23+ block 42. Specifically, the block 42 includes circuitry to implement the various steps in the mapping method 10 to asynchronously map the OPU3e2 40 into an OTU3+ container. From the block 42, an ODTUG 3x 44 receives the output of the block 42 and provides an Optical channel Payload Unit level 3+ (OPU3+) 46 that is part of the OTU3+. The OPU3+ 46 is mapped into an Optical channel Data Unit level 3+ (ODU3+) 48. The ODU3+ 48 can be provided to optical components, e.g. transceivers, modems, etc., configured to operate at the OTU3+ proprietary rate. Thus, via the mapping circuit 30 provides an OPU3e2 over legacy hardware configured to operate at OTU3+.

Figure 3:
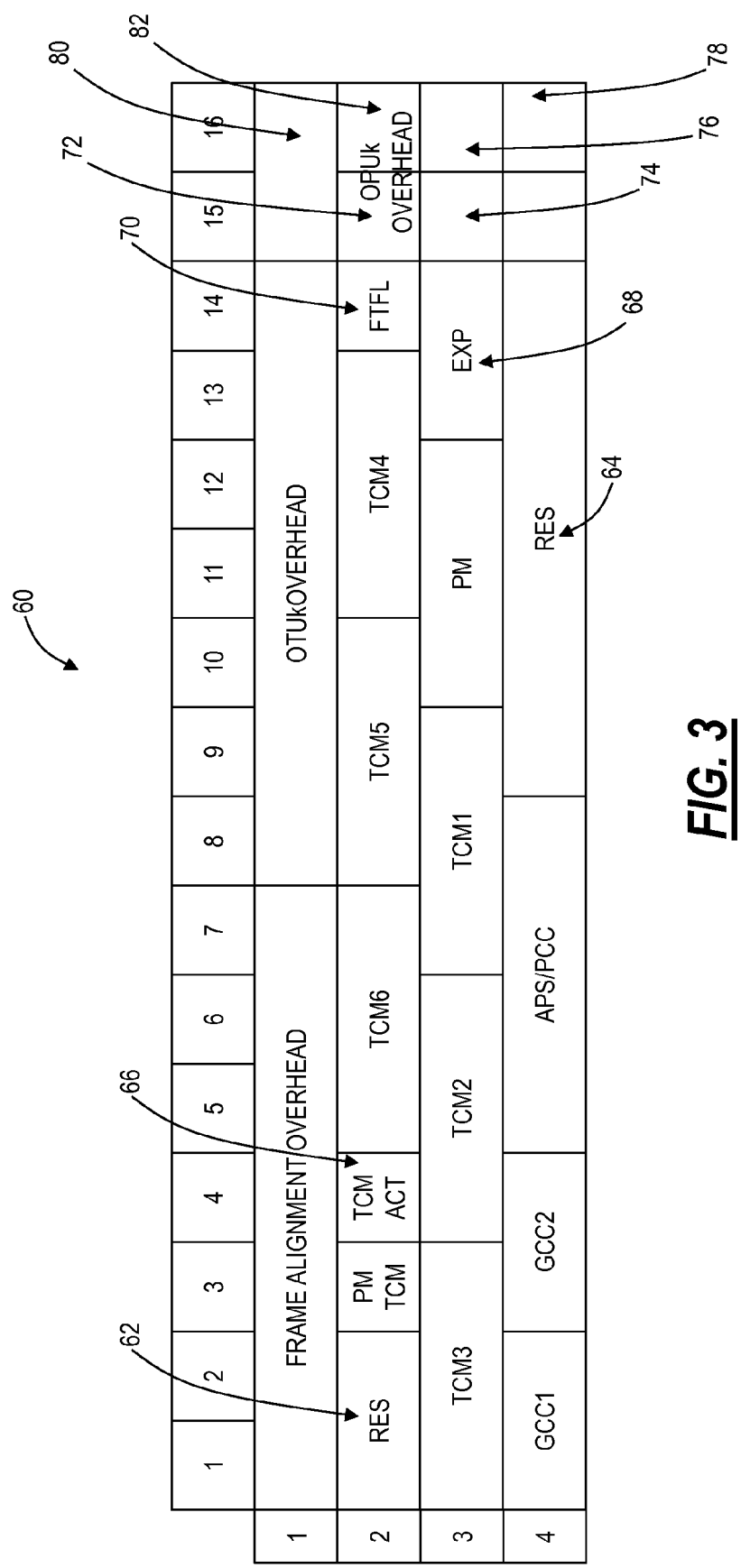
FIG. 3 is a block diagram of overhead from an exemplary Optical channel Data Unit level 3+ (ODU3+) frame.

Referring to FIG. 3, in an exemplary embodiment, a block diagram illustrates overhead 60 from an exemplary Optical channel Data Unit level 3+ (ODU3+) frame. The ODU3+ frame is used to carry an ODU3e2 using the mapping method 10 and/or the mapping circuit 30. The overhead 60 includes four rows and sixteen columns. Columns 15-16 represent OPUk overhead. As described in the mapping method 10, portions of the overhead 60 of the ODU3+, i.e. the second signal, are used for payload bytes, pointer bytes, and justification control (JC). In an exemplary embodiment providing an ODU3e2 into an ODU3+, the overhead 60 uses RES bytes 62, 64, TCM ACT byte 66, EXP bytes 68, FTFL byte 70, and mapping specific overhead bytes 72, 74, 76, 78 in the OPUk overhead for payload from the ODU3e2.

The overhead 60 can use mapping specific overhead bytes 80 in the OPUk overhead for the pointer. The overhead 60 can use mapping specific overhead bytes 82 in the OPUk overhead for the justification control. As described herein, the OPU3e2 does not have FAS, and instead uses a pointer in the overhead 60. In an exemplary implementation, the pointer can have 8 byte granularity (i.e., 11 bits) given a 256-bit parallel implementation. In an exemplary implementation, the justification can be on a 16 byte granularity with a remainder (CnD) used to mitigate jitter in a timing block (4-bits) given a 256-bit parallel implementation. Justification control (16-bytes vs 0-bytes) uses pattern 0x55 or 0xaa with no repetition but bit-wise voting is used within the byte.

Figure 4:
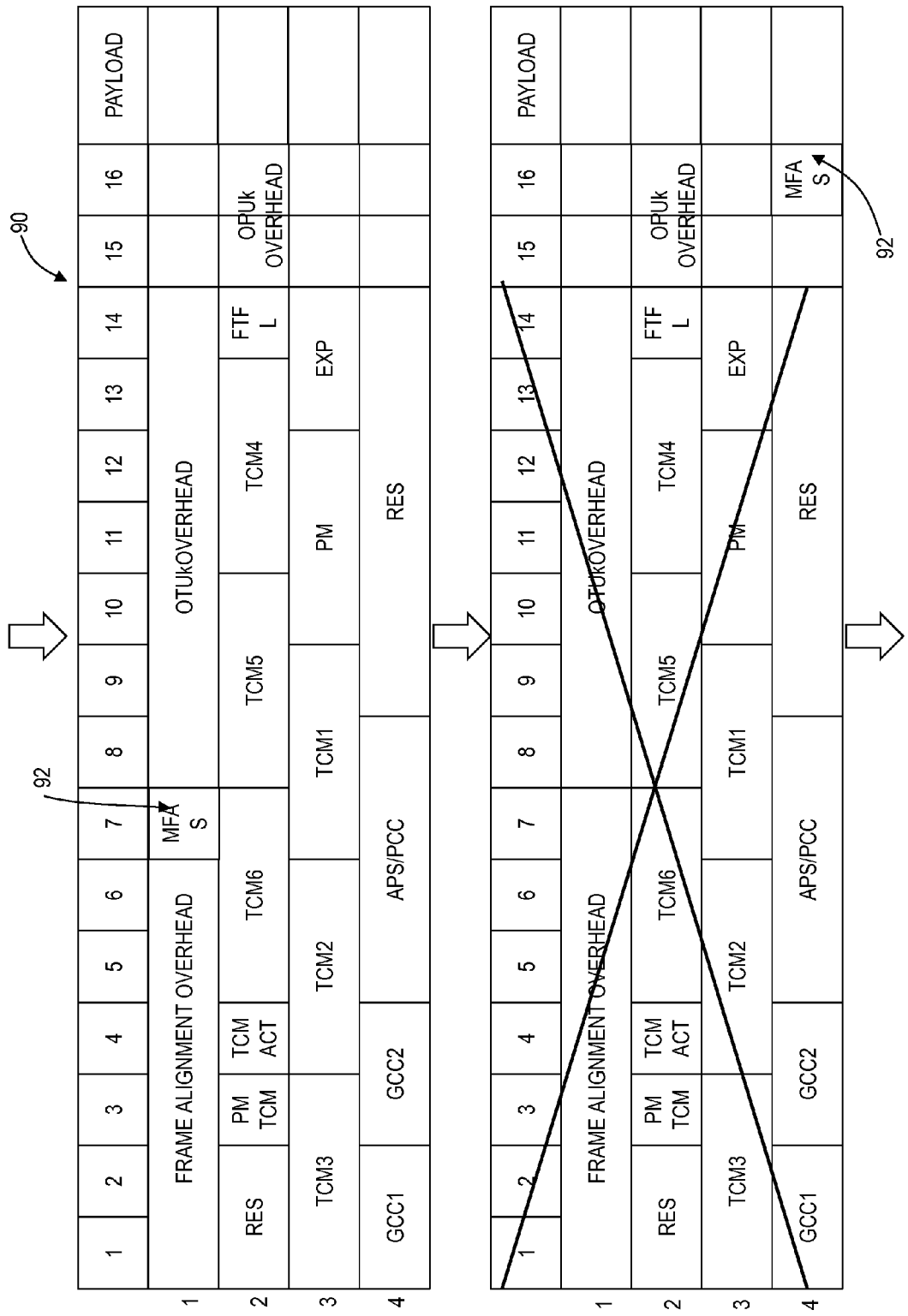
FIG. 4 is a block diagram of overhead from an exemplary OPU3e2 frame before and after mapping with the mapping method.

Referring to FIG. 4, in an exemplary embodiment, a block diagram illustrates overhead from an exemplary OPU3e2 frame 90 before and after mapping with the mapping method 10. The OPU3e2 frame 90 includes a MFAS byte 92 that is relocated to the OPUk overhead in the mapping method 10. The OPU3e2 frame 90 is shuffled around but logic circuitry remaps the frame. In the OPUk overhead, columns 15, 16 and rows 1-3 are used for justification control and pointers. Pointer interpreter logic used to reconstruct OPU3e2/ODU3e2.

Figure 5:
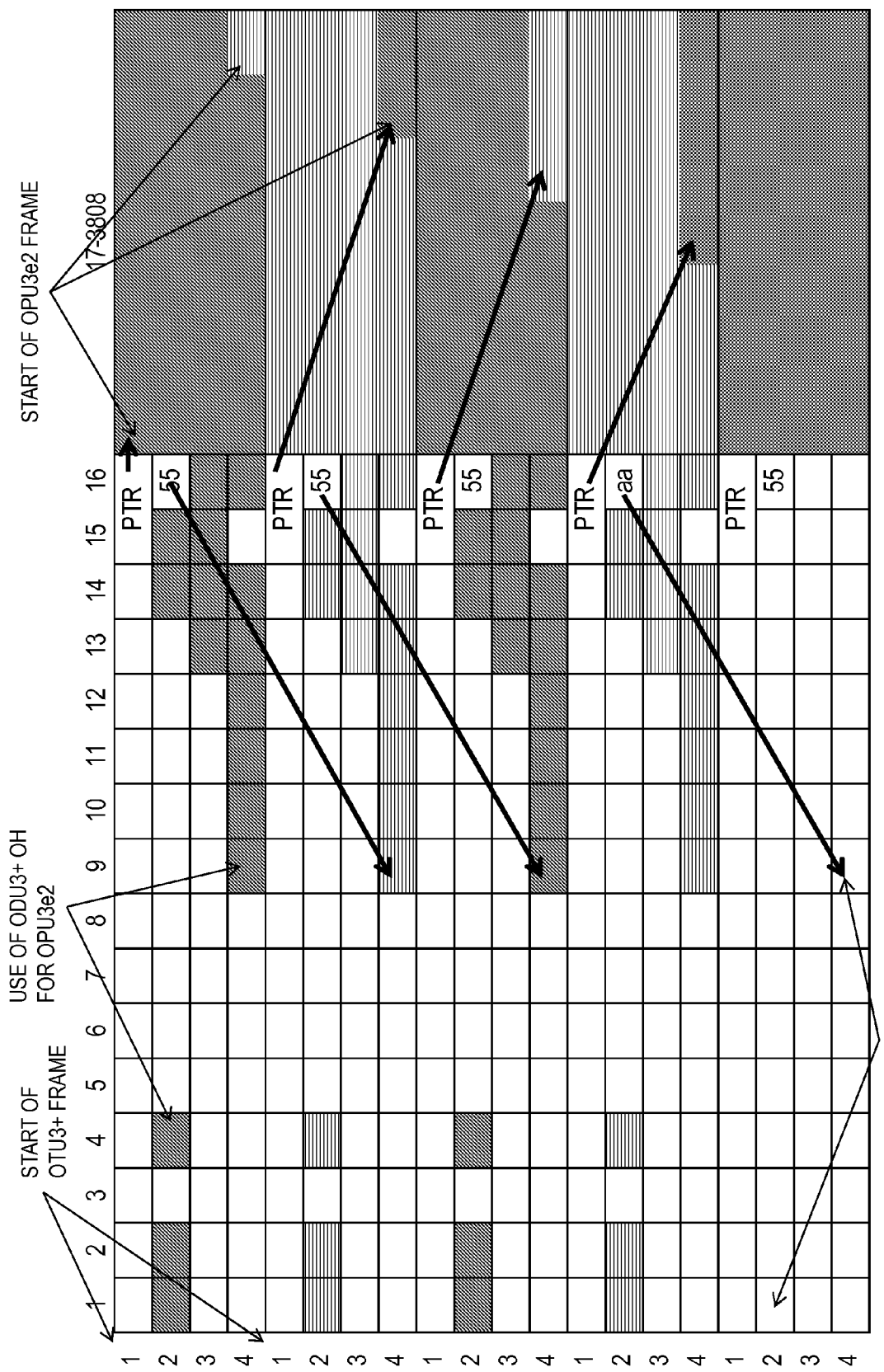
FIG. 5 is a block diagram of an exemplary mapping of an OPU3e2 inside an ODU3+ using the mapping method of FIG. 1 and/or the mapping circuit of FIG. 2.

Referring to FIG. 5, in an exemplary embodiment, a block diagram illustrates an exemplary mapping of an OPU3e2 inside an ODU3+ using the mapping method 10 and/or the mapping circuit 30. FIG. 5 includes five ODU3+ frames and illustrates use of the overhead of the ODU3+ for payload, pointers, and justification control to map OPU3e2 frames. At each first row and first column, a new ODU3+ frame starts. Highlight sections of the ODU3+ overhead show where ODU3+ overhead is used for OPU3e2. The pointer is located in row 1, columns 15-16 and it points to the start of each OPU3e2 frame in the ODU3+ payload. Justification control is in row 2, column 16 and it includes one of two values, 0xAA or 0x55 to have justification of 16 bytes (0x55) or no justification (0xAA).

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An Optical Transport Network (OTN) High Order (HO) mapping method, comprising: receiving a first HO signal at a first rate; asynchronously mapping the first HO signal into a second HO signal at a second rate, wherein the first rate and the second rate are substantially similar, wherein the first HO signal and the second HO signal are both OTN signals, and wherein the asynchronously mapping comprises translating a portion of OTN overhead from the first HO signal to OTN overhead of the second HO signal, and utilizing pointers in the OTN overhead of the second HO signal for frame alignment of the first HO signal instead of utilizing frame alignment signals in the OTN overhead of the second HO signal; and transmitting the second HO signal with the OTN overhead of the second HO signal, and wherein the second HO signal comprises the first HO signal with the portion of OTN overhead from the first HO signal.

2. The OTN HO mapping method of claim 1, further comprising: stripping a portion of the overhead from the first HO signal.

3. The OTN HO mapping method of claim 2, further comprising: translating the portion of overhead comprising Path Monitoring bytes and Tandem Connection Monitoring bytes from the first HO signal to the overhead of the second HO signal.

4. The OTN HO mapping method of claim 3, further comprising: stripping the portion of the overhead from the first HO signal comprising a remainder of the overhead besides the Path Monitoring bytes, Tandem Connection Monitoring bytes, and Optical channel Path Unit level k overhead.

5. The OTN HO mapping method of claim 1, further comprising: stripping a Frame Alignment Signal byte from the overhead from the first HO signal and utilizing the pointers to preserve frame alignment.

6. The OTN HO mapping method of claim 1, further comprising: moving a Multi Frame Alignment Signal byte from the overhead of the first HO signal to another unused location of the overhead of the first HO signal or into the second HO signal.

7. The OTN HO mapping method of claim 1, wherein the first HO signal and the second HO signal are asynchronous to one another.

8. The OTN HO mapping method of claim 1, wherein the first rate is slightly larger than the second rate, and the OTN HO mapping method further comprising: utilizing a portion of the overhead of the second HO signal for a portion of payload of the first HO signal and some of the overhead of the first HO signal.

9. The OTN HO mapping method of claim 1, wherein the pointers are located in mapping specific overhead bytes in Optical channel Path Unit level k (OPUk) overhead.

10. The OTN HO mapping method of claim 1, further comprising: communicating phase and frequency information of the first HO signal via justification events in justification control bytes in the overhead of the second HO signal.

11. The OTN HO mapping method of claim 10, wherein the justification control bytes are located in mapping specific overhead bytes in Optical channel Path Unit level k (OPUk) overhead.

12. An Optical Transport Network (OTN) High Order (HO) mapping circuit, comprising: circuitry configured to: receive a first HO signal at a first rate; asynchronously map the first HO signal into a second HO signal at a second rate, wherein the first rate and the second rate are substantially similar, wherein the first HO signal and the second HO signal are both OTN signals, and wherein, to asynchronously map, the circuitry is configured to translate a portion of OTN overhead from the first HO signal to OTN overhead of the second HO signal, and utilize pointers in the OTN overhead of the second HO signal for frame alignment of the first HO signal instead of utilizing frame alignment signals in the OTN overhead of the second HO signal; and transmit the second HO signal with the OTN overhead of the second HO signal, and wherein the second HO signal comprises the first HO signal with the portion of OTN overhead from the first HO signal; wherein the first HO signal and the second HO signal are asynchronous to one another.

13. The OTN HO mapping circuit of claim 12, wherein the circuitry is further configured to:
strip a portion of the overhead from the first HO signal.

14. The OTN HO mapping circuit of claim 13, wherein the circuitry is further configured to: translate the portion of overhead comprising Path Monitoring bytes and Tandem Connection Monitoring bytes from the first HO signal to the overhead of the second HO signal; and strip the portion of the overhead from the first HO signal comprising a remainder of the overhead besides the Path Monitoring bytes, Tandem Connection Monitoring bytes, and Optical channel Path Unit level k overhead.

15. The OTN HO mapping circuit of claim 12, wherein the circuitry is further configured to: strip a Frame Alignment Signal byte from the overhead from the first HO signal and utilize the pointers to preserve frame alignment.

16. The OTN HO mapping circuit of claim 12, wherein the circuitry is further configured to: move a Multi Frame Alignment Signal byte from the overhead of the first HO signal to another unused location of the overhead of the first HO signal or into the second HO signal.

17. The OTN HO mapping circuit of claim 12, wherein the first rate is slightly larger than the second rate, and wherein the circuitry is further configured to: utilize a portion of the overhead of the second HO signal for a portion of payload of the first HO signal.

18. The OTN HO mapping circuit of claim 12, wherein the pointers are located in mapping specific overhead bytes in Optical channel Path Unit level k (OPUk) overhead.

19. The OTN HO mapping circuit of claim 12, wherein the circuitry is further configured to: communicate phase and frequency information of the first HO signal via justification events in justification control bytes in the overhead of the second HO signal; wherein the justification control bytes are located in mapping specific overhead bytes in Optical channel Path Unit level k (OPUk) overhead.

20. An optical system, comprising: circuitry configured to: receive a first HO signal at a first rate; asynchronously map the first HO signal into a second HO signal at a second rate, wherein the first rate and the second rate are substantially similar, and wherein the first HO signal and the second HO signal are both OTN signals, and wherein, to asynchronously map, the circuitry is configured to; translate a portion of OTN overhead from the first HO signal to OTN overhead of the second HO signal, and utilize pointers in the OTN overhead of the second HO signal for frame alignment of the first HO signal instead of utilizing frame alignment signals in the OTN overhead of the second HO signal; and transmit the second HO signal with the OTN overhead of the second HO signal, and wherein the second HO signal comprises the first HO signal with the portion of OTN overhead from the first HO signal; wherein the first HO signal and the second HO signal are asynchronous to one another; and optical components configured to operate at the second rate and interface the first HO signal within the second HO signal.

\* \* \* \* \*